Patented Aug. 20, 1940

2,212,028

UNITED STATES PATENT OFFICE 2,212,028

DYESTUFF OF THE ANTHRAQUINONE SERIES

Ralph N. Lulek, South Milwaukee, Wis., assignor to E. I. du Pont de Nemours & Company, Wilmington, Del., a corporation of Delaware No Drawing. Application April 5, 1937, Serial No. 135,078

1 Claim. (Cl. 260—316)

This invention relates to the preparation of new and valuable dyestuffs of the anthraquinone series and more particularly to the preparation of new and valuable diacidylaminotrianthrimide carbazole vat dyestuffs which dye cotton in bright orange shades and which exhibit excellent fastness properties.

A number of dyestuffs have been prepared in the anthrimide series which dye cotton in shades ranging from orange to dark brown and olive and which vary in affinity for cellulose fibers. A number of these dyestuffs are described in U. S. Patents 970,278, 1,690,236, and 2,030,253.

I have found that a new and valuable orange dyestuff which dyes in bright shades and which exhibits excellent fastness properties can be prepared in good yields by condensing 1 mole of 1,5-diaminoanthraquinone with 2 moles of 1-benzoylamino-5-chloroanthraquinone or by condensing 1 mole of 1,5-dichloro-(or dibromo) anthraquinone with 2 moles of 1-amino-5-benzoylaminoanthraquinone and ringclosing the resulting trianthrimide thus formed to the anthrimide carbazole derivative with aluminum chloride in nitrobenzene, pyridine, or other tertiary organic base. Although the properties of the dyestuff obtained by this process are similar to those of the product disclosed in U. S. Patent 1,912,378 (p. 2, lines 30–39), the present process gives yields of from 2 to 3 times as high as the patented process, and the present product dyes in much brighter and more desirable shades.

The condensation of these chloroanthraquinones and aminoanthraquinones may be effected by the processes generally employed for the preparation of anthrimides, using any of the inert organic solvents of the prior art; nitrobenzene, however, is preferred for the subsequent ringclosure can then be effected without isolating the anthrimide from the original condensation mass, by the addition of aluminum chloride, and heating. The carbazole ringclosure of the trianthrimide may also be carried out in pyridine or other organic bases with aluminum chloride.

The following examples are given to more fully illustrate the invention. The parts used are by weight.

Example 1

21 parts of 1,5-diaminoanthraquinone, 64 parts of 1-benzoylamino-5-chloroanthraquinone, 30 parts of soda ash and 1 part of cuprous chloride are heated in 700 parts of trichlorobenzene to reflux temperature for 8 hours. The mass is cooled to room temperature and filtered. The filter cake is washed with trichlorobenzene, alcohol, and water, and dried.

10 parts of this 5',5''-di(benzoylamino)-1',1,5,1''-trianthrimide as obtained above are suspended in 100 parts of nitrobenzene and 50 parts of aluminum chloride (ground) are added gradually, starting at room temperature. The temperature is then raised to 60 to 65° C. and maintained for 10 to 15 minutes. After cooling the mass to room temperature it is drowned in ice water and the nitrobenzene removed by steam distillation. The crude dyestuff is filtered off, washed with water, and dried. It may be purified by acid pasting and treating with bichromate in dilute sulfuric acid. If an especially bright product is desired after-treatment with alkaline hypochloride is advantageous. The resulting dyestuff dyes in bright orange shades from a brown vat and dissolves in concentrated sulfuric acid with a blue color. It has the following probable formula:

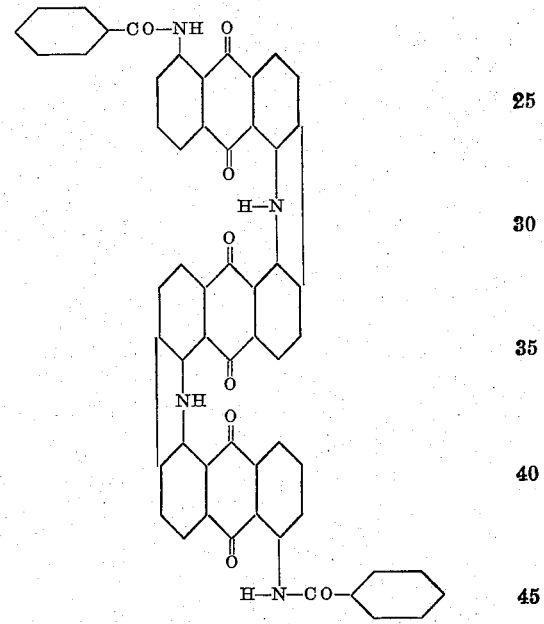

Example 2

21 parts of 1,5-diaminoanthraquinone, 64 parts of 1-benzoylamino-5-chloroanthraquinone, 30 parts of sodium acetate and 1 part of cupric chloride are heated in 700 parts of nitrobenzene at reflux temperature for 8 hours. The mass is cooled to room temperature and 225 parts of aluminum chloride (ground) are slowly added, allowing the temperature to rise to 60° C. Then the mass is heated to 90 to 95° C. and held at this temperature for 1 hour. After cooling to room temperature, the mass is drowned in 2000 parts of ice water and agitated for 3 hours. The nitrobenzene is removed by steam distillation and the residue filtered and washed with water. The resulting paste is milled and purified by bleaching with alkaline hypochlorite solution for several hours. The dyestuff is filtered off, washed with water, and dried. It dyes in bright yellow-brown shades and may be further purified by the following method.

50 parts of the crude dry color are dissolved in 500 parts of concentrated sulfuric acid at 15° C. When the solution appears complete, 64 parts of water are slowly added, keeping the temperature at 15 to 20° C. The pure dyestuff separates from the reaction mass in fine orange needles which are filtered off, washed with 85% sulfuric acid and finally with ice water. The resulting dyestuff dyes in bright orange shades.

The identical product prepared by the processes as outlined in the above examples may also be obtained by substituting the molecular equivalents of 1,5-dichloroanthraquinone for the 1,5-diaminoanthraquinone used in the examples, and in that process substituting the molecular equivalent of 1-amino-5-benzoylaminoanthraquinone for the 1-benzoylamino-5-chloroanthraquinone; the proportions of other reactants used and the conditions under which the fusion, condensation and purification described in the above examples are carried out being the same.

I claim:

The benzoylamino-substituted trianthrimide-carbazole vat dyestuff which dyes in bright orange shades from a brown hydrosulfite vat and which exhibits a blue color in sulfuric acid, said compound being obtained by condensing 1 mole of a compound of the formula

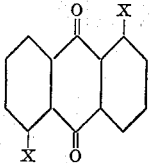

with 2 moles of a compound of the formula:

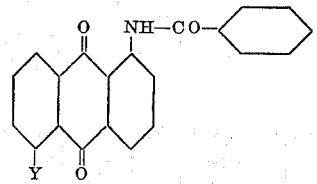

wherein X and Y stand for radicals of the class consisting of —NH$_2$ and halogen, but in all cases where X stands for —NH$_2$ Y stands for halogen, and where X stands for halogen Y stands for —NH$_2$, effecting ring-closure of said condensation product by heating the same with aluminum chloride in a solvent of the class consisting of nitrobenzene and tertiary organic bases, isolating the resulting product and effecting purification by treating same in an aqueous suspension with an oxidizing agent of the class consisting of acid and alkaline oxidizing agents.

RALPH N. LULEK.